(12) United States Patent
Ohno

(10) Patent No.: US 7,830,483 B2
(45) Date of Patent: Nov. 9, 2010

(54) LIQUID CRYSTAL DISPLAY DEVICE

(75) Inventor: Yasuhiro Ohno, Kanagawa (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1181 days.

(21) Appl. No.: 11/439,176

(22) Filed: May 24, 2006

(65) Prior Publication Data
US 2006/0285048 A1 Dec. 21, 2006

(30) Foreign Application Priority Data
May 25, 2005 (JP) ............................... 2005-152078

(51) Int. Cl.
*G02F 1/1343* (2006.01)
(52) U.S. Cl. ........................... 349/139; 349/38; 349/39; 349/111; 349/141
(58) Field of Classification Search ................... 349/38, 349/39, 139, 141
See application file for complete search history.

(56) References Cited

U.S. PATENT DOCUMENTS

| 5,502,583 | A | 3/1996 | Sukegawa et al. | |
|---|---|---|---|---|
| 5,648,826 | A * | 7/1997 | Song et al. | 349/42 |
| 6,259,200 | B1 * | 7/2001 | Morita et al. | 313/498 |
| 6,476,881 | B2 * | 11/2002 | Ozaki et al. | 349/43 |
| 6,940,579 | B2 * | 9/2005 | Ozaki et al. | 349/192 |
| 7,304,691 | B2 * | 12/2007 | Song et al. | 349/39 |
| 2002/0097365 | A1 * | 7/2002 | Yang et al. | 349/141 |
| 2002/0131010 | A1 * | 9/2002 | Ozaki et al. | 349/192 |
| 2002/0176043 | A1 * | 11/2002 | Fukami et al. | 349/141 |
| 2004/0046917 | A1 * | 3/2004 | Nakayoshi et al. | 349/141 |
| 2004/0105042 | A1 * | 6/2004 | Huang et al. | 349/44 |
| 2004/0183977 | A1 * | 9/2004 | Kitagawa et al. | 349/141 |
| 2004/0222419 | A1 * | 11/2004 | Matsui et al. | 257/59 |

FOREIGN PATENT DOCUMENTS

| JP | 7-98462 A | 4/1995 |
|---|---|---|
| JP | 10-301140 A | 11/1998 |

* cited by examiner

*Primary Examiner*—David Nelms
*Assistant Examiner*—Thanh-Nhan P Nguyen
(74) *Attorney, Agent, or Firm*—Birch, Stewart, Kolasch & Birch, LLP

(57) ABSTRACT

The invention relates to a liquid crystal display device used for a display unit of electronic equipment, and an object is to provide a liquid crystal display of a high quality without shading in the display that is caused by deviation in the positions of patterns. Compensation electrodes are formed on the regions across which the data bus lines and the pixel electrodes are opposed to each other, the compensation electrodes being formed simultaneously with the data bus lines by using the same exposing mask. The compensation electrodes are electrically connected to the pixel electrode through the contact holes, and assumes the same potential as the one applied to the pixel electrode.

13 Claims, 12 Drawing Sheets

LIQUID CRYSTAL DISPLAY DEVICE

BACKGROUND OF THE INVENTION

1. Field of the Invention

This invention relates to a liquid crystal display device used for a display unit such as of electronic equipment.

2. Description of the Related Art

In recent years, a liquid crystal display device of the active matrix type having a thin-film transistor (TFT) for each pixel has been widely used as a display device for a variety of applications.

FIG. 8 illustrates the constitution of a pixel in a conventional active matrix liquid crystal display device. A metal layer formed on the whole surface of the substrate is patterned to form gate bus lines 106 and storage capacitor bus lines 108. Next, a gate-insulating film (not shown), an operation semiconductor layer and a channel protection layer (both of which are not shown) are formed on the whole surface of the substrate on the gate bus lines 106 and on the storage capacitor bus lines 108, and an operation semiconductor layer and a channel protection film 110 are patterned on the gate bus lines 106. Here, the gate-insulating film is formed on the whole surface of the substrate. Next, an n⁺ semiconductor layer and a metal layer are formed on the whole surface of the substrate on the gate-insulating film, on the operation semiconductor layer and on the channel protection film 110, and are patterned to form source electrodes S, storage capacitor electrodes 112 and data bus lines 114.

Next, a protection film (not shown) is formed on the whole surface of the substrate on the source electrodes S, on the storage capacitor electrodes 112 and on the data bus lines 114. Next, the protection film on the storage capacitor electrodes 112 and on the source electrodes S is removed by etching to form contact holes 116 and 122. Next, pixel electrodes 118 made of a transparent material are formed. The pixel electrodes 118 are electrically connected to the storage capacitor electrodes 112 and to the source electrodes S, respectively, through the contact holes 116 and 122.

FIG. 9 is an equivalent circuit of a pixel shown in FIG. 8. Referring to FIG. 9, a parasitic capacitance Cgs is present between the gate bus line 106 and the source electrode S of a TFT 120, parasitic capacitances Cds1 and Cds2 are present among the two parallel data bus lines 114 and the pixel electrode 118, and a parasitic capacitance Cs is present between the storage capacitor bus line 108 and the pixel electrode 118. Further, the pixel electrode 118 or the liquid crystal cell is expressed by a parallel circuit of a liquid crystal capacitance CLC and a liquid crystal resistance RLC.

FIG. 10 illustrates voltage waveforms of a gate pulse voltage Vg applied to the gate bus line 106 in the pixel shown in FIGS. 8 and 9, of a data signal voltage Vd applied to the data bus line 114 and of a pixel voltage Vp applied to the pixel electrode 118. FIG. 10 shows voltage waveforms of when the data signal voltage Vd is applied to the neighboring data bus lines 114 in reverse polarities, the data signal voltage Vd being a voltage waveform applied to the data bus line 114 on the left side in FIGS. 8 and 9. Further, the gate pulse voltage Vg shown in FIG. 10 is a voltage waveform applied to the gate bus line 106 on the upper side in FIGS. 8 and 9.

Referring to FIG. 10, a high-level period after the gate pulse voltage Vg applied to the gate bus line 106 has changed into Vgon from Vgoff, is a selection period Ton in which the TFT 120 is turned on. A low-level period after the gate pulse voltage Vg has changed into Vgoff from Vgon is a non-selection period Toff in which the TFT 120 is turned off. In the selection period Ton, the TFT 120 is turned on, and the data signal voltage Vd of positive polarity applied to the data bus line 114 is further applied to the pixel electrode 118 through the source electrode S of TFT 120. Thereafter, when the gate pulse voltage Vg falls from Vgon to Vgoff, the potential of the pixel electrode 118 decreases by $\Delta V$ (Cgs) as shown in FIG. 10 due to the parasitic capacitance Cgs.

[Patent document 1] JP-A-10-301140

When a distance (left side distance d1) between the pixel electrode 118 and the data bus line 114 on the left side in FIGS. 8 and 9 is equal to a distance (right side distance d2) between the pixel electrode 118 and the data bus line 114 on the right side in the drawings, the pixel voltage Vp of the pixel electrode 118 assumes a nearly constant voltage waveform in the non-selection period Toff as shown in FIG. 10. However, the data bus line 114 and the pixel electrode 118 are formed by different layers. In practice, therefore, an overlapping error occurs due to dispersion in the production process, and a difference occurs between the left side distance d1 and the right side distance d2 in the display surface.

FIG. 11 shows a voltage waveform such as of the pixel voltage Vp or the like of when the left side distance d1 is shorter than the right side distance d2. When the left side distance d1 is shorter than the right side distance d2, the capacitance value of the parasitic capacitance Cds1 that takes place between the pixel electrode 118 and the data bus line 114 on the left side in FIG. 9 becomes greater than the capacitance value of the parasitic capacitance Cds2 that takes place between the pixel electrode 118 and the data bus line 114 on the right side. Therefore, in the non-selection period Toff in which the TFT 120 is turned off, as shown in FIG. 11, when the data signal voltage Vd of the data bus line 114 changes from a voltage Vdh of positive polarity into a voltage Vdl of negative polarity or vice versa, the pixel voltage Vp varies by $\Delta V$ (Cds) following the change in the data signal voltage Vd of the data bus line 114 on the left side due to the parasitic capacitance Cds1. For example, the pixel voltage Vp decreases by $\Delta V$ (Cds) at a moment when the data signal voltage Vd of the data bus line 114 of the left side falls to the voltage Vdl of negative polarity from the voltage Vdh of positive polarity.

FIG. 12 shows a voltage waveform such as of the pixel voltage Vp of when the left side distance d1 is longer than the right side distance d2. When the left side distance d1 is longer than the right side distance d2, the capacitance value of the parasitic capacitance Cds2 becomes greater than the capacitance value of the parasitic capacitance Cds1. Therefore, in the non-selection period Toff in which the TFT 120 is turned off, as shown in FIG. 12, when the data signal voltage Vd of the data bus line 114 changes from a voltage Vdh of positive polarity into a voltage Vdl of negative polarity or vice versa, the pixel voltage Vp varies by $\Delta V$ (Cds) following the change in the data signal voltage Vd of the data bus line 114 on the right side due to the parasitic capacitance Cds2. For example, the data signal voltage Vd of the data bus line 114 on the right side rises from the voltage Vdl of negative polarity to the voltage Vdh of positive polarity at a moment when the data signal voltage Vd of the data bus line 114 of the left side falls down to the voltage Vdl of negative polarity from the voltage Vdh of positive polarity. Therefore, the pixel voltage Vp increases by $\Delta V$ (Cds).

Here, if the amount of change in the data signal voltage Vd is denoted by $\Delta Vd$, then, $\Delta V(Cds)$ is expressed as follows:

$$\Delta V(Cds) = |(\Delta Vd \cdot Cds1/(Cs+CLC+Cds1+Cds2) - \Delta Vd \cdot Cds2/(Cs+CLC+Cds1+Cds2)| \quad (1)$$

When there occurs a difference between the left side distance d1 and the right side distance d2, there occurs a difference between the capacitance value of the parasitic capacitance Cds1 and the capacitance value of the parasitic capacitance Cds2, too, causing the pixel voltage Vp to vary. That is, when the difference between the left side distance d1 and the right side distance d2 in a predetermined region A on the display surface is not the same as the difference between the left side distance d1 and the right side distance d2 in a predetermined region B, the pixel voltage Vp applied to the pixels deviates from a desired voltage in different amounts depending upon the regions A and B. Therefore, shading in the brightness is seen on the display screen causing a conspicuous decrease in the quality of display of the liquid crystal display device.

SUMMARY OF THE INVENTION

It is an object of the present invention to provide a liquid crystal display device of a high quality without shading in the display that is caused by deviation in the positions of the patterns.

The above object is achieved by a liquid crystal display device comprising: a plurality of first bus lines formed in parallel with each other on a substrate; a plurality of second bus lines formed in parallel with each other intersecting the plurality of the first bus lines via an insulating film; pixel regions formed on the regions defined by the first and the second bus lines; pixel electrodes formed on the pixel regions by being exposed to light through an exposing mask different from the second bus lines; and compensation electrodes formed simultaneously with the second bus lines by being exposed to light and arranged on the gaps across which the second bus lines and the pixel electrodes are opposed to each other, the compensation electrodes assuming the same potential as the pixel electrodes.

The above object is further achieved by a liquid crystal display device comprising: a plurality of first bus lines formed in parallel with each other on a substrate; a plurality of second bus lines formed in parallel with each other intersecting the plurality of the first bus lines via an insulating film; pixel regions formed on the regions defined by the first and the second bus lines; thin-film transistors having a source electrode formed simultaneously with the second bus lines by being exposed to light, the thin-film transistors being formed for each of the pixel regions; pixel electrodes formed by being exposed to light through an exposing mask different from the second bus lines and are connected to the source electrodes; and compensation electrodes formed simultaneously with the second bus lines by being exposed to light in a pattern continuing to the source electrodes, and are arranged on the gaps across which the second bus lines and the pixel electrodes are opposed to each other.

The above object is further achieved by a liquid crystal display device comprising: a plurality of first bus lines formed in parallel with each other on a substrate; a plurality of second bus lines formed in parallel with each other intersecting the plurality of the first bus lines via an insulating film; pixel regions formed on the regions defined by the first and the second bus lines; thin-film transistors having a source electrode formed simultaneously with the second bus lines by being exposed to light, the thin-film transistors being formed for each of the pixel regions; first pixel electrodes formed by being exposed to light through an exposing mask different from the second bus lines and are connected to the source electrodes; upper electrodes of storage capacitors formed simultaneously with the second bus lines by being exposed to light and are connected to the first pixel electrodes; and compensation electrodes formed simultaneously with the second bus lines by being exposed to light in a pattern continuing to the upper electrodes of the storage capacitors, and are arranged on the gaps across which the second bus lines and the pixel electrodes are opposed to each other.

In the liquid crystal display device according to the invention, the compensation electrodes are arranged on the gaps across which the second bus lines and the pixel electrodes are opposed to each other in a manner of being overlapped on the pixel electrode and separated away therefrom by a predetermined distance, and assume the same potential as the pixel electrode.

In the liquid crystal display device according to the invention, the compensation electrodes are arranged on the gaps across which the second bus lines and the pixel electrodes are opposed to each other in a manner of being overlapped on the pixel electrode and separated away therefrom by a predetermined distance, assume the same potential as the pixel electrode, and are formed in a pattern continuing to the source electrodes.

In the liquid crystal display device according to the invention, the compensation electrodes are arranged on the gaps across which the second bus lines and the pixel electrodes are opposed to each other in a manner of being overlapped on the pixel electrode and separated away therefrom by a predetermined distance, assume the same potential as the pixel electrode, and are formed in a pattern continuing to the upper electrodes of the storage capacitors.

In the liquid crystal display device according to the invention, the compensation electrodes are formed by using the same material as the second bus lines.

In the liquid crystal display device according to the invention, the compensation electrodes are formed by using part of the materials that constitute the second bus lines.

In the liquid crystal display device according to the invention, the compensation electrodes are formed by using a transparent material that constitutes the second bus lines.

In the liquid crystal display device according to the invention, the compensation electrodes are formed by using a laminate of a-Si, n$^+$a-Si and Ti films.

In the liquid crystal display device according to the invention, the compensation electrodes are formed by using a Ti film.

In the liquid crystal display device according to the invention the compensation electrodes are formed by using a laminate of a-Si and n$^+$a-Si films.

In the liquid crystal display device according to the invention, the compensation electrodes are formed by using a-Si, n$^+$a-Si and ITO films.

In the liquid crystal display device according to the invention, the compensation electrodes are formed by using an ITO film.

In the liquid crystal display device according to the invention, the compensation electrodes are formed by using a-Si, n$^+$a-Si and ZnO films.

In the liquid crystal display device according to the invention, the compensation electrodes are formed by using a ZnO film.

In the liquid crystal display device according to the invention, is characterized in the two second bus lines neighboring each other are applied with signal voltages of reverse polarities to each other.

According to the present invention, there is realized a liquid crystal display device of a high quality without shading in the display that is caused by deviation in the positions of patterns.

DETAILED DESCRIPTION OF THE INVENTION

First Embodiment

A liquid crystal display device according to a first embodiment of the invention will now be described with reference to FIGS. 1 and 2. First, the schematic constitution of a pixel in the liquid crystal display device according to the embodiment and a method of its production will be described with reference to FIG. 1 which is a view illustrating a plane layout of the pixel of the liquid crystal display device according to the embodiment.

Figure 1:
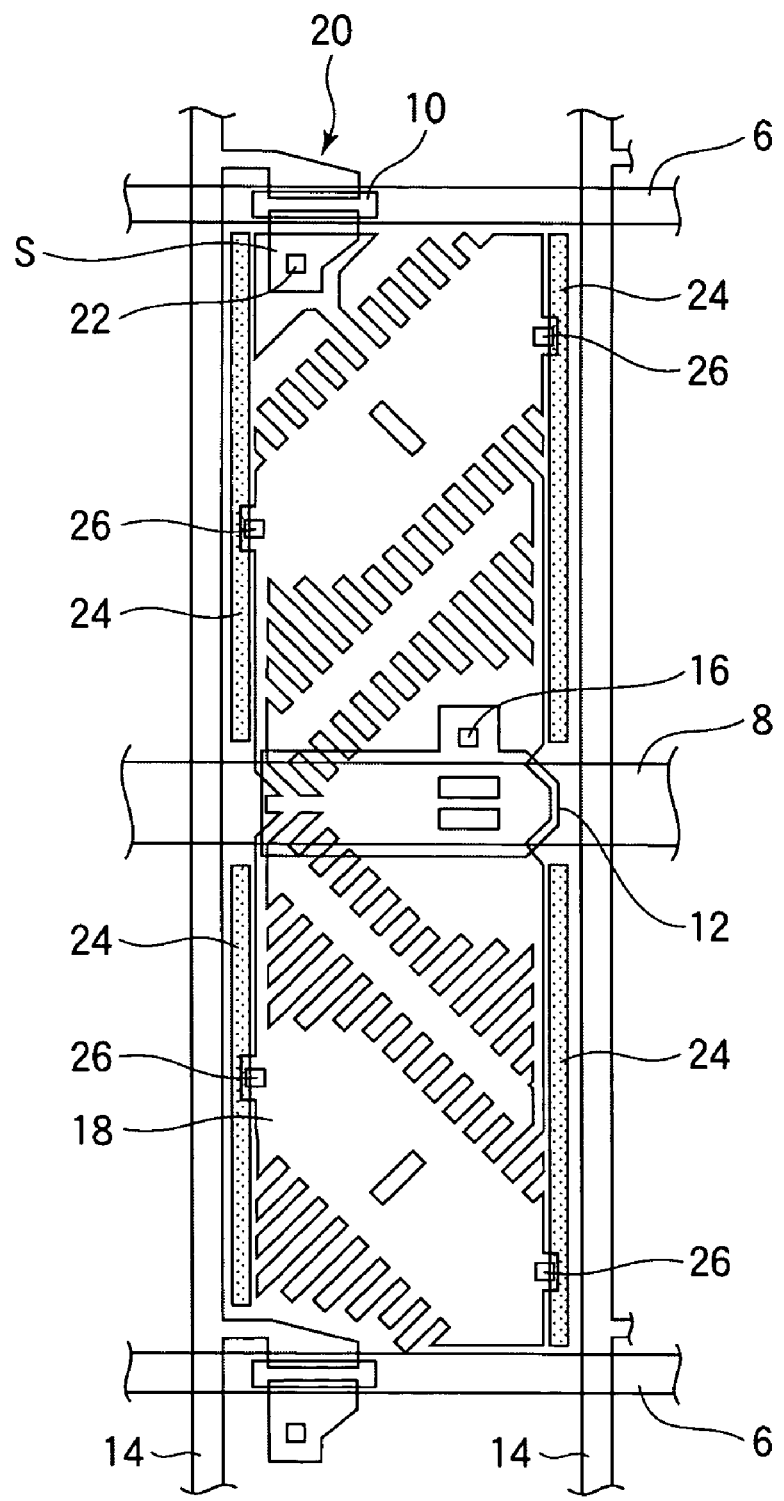
FIG. 1 is a view illustrating a plane layout of a pixel of a liquid crystal display device according to a first embodiment of the invention.
Figure 2:
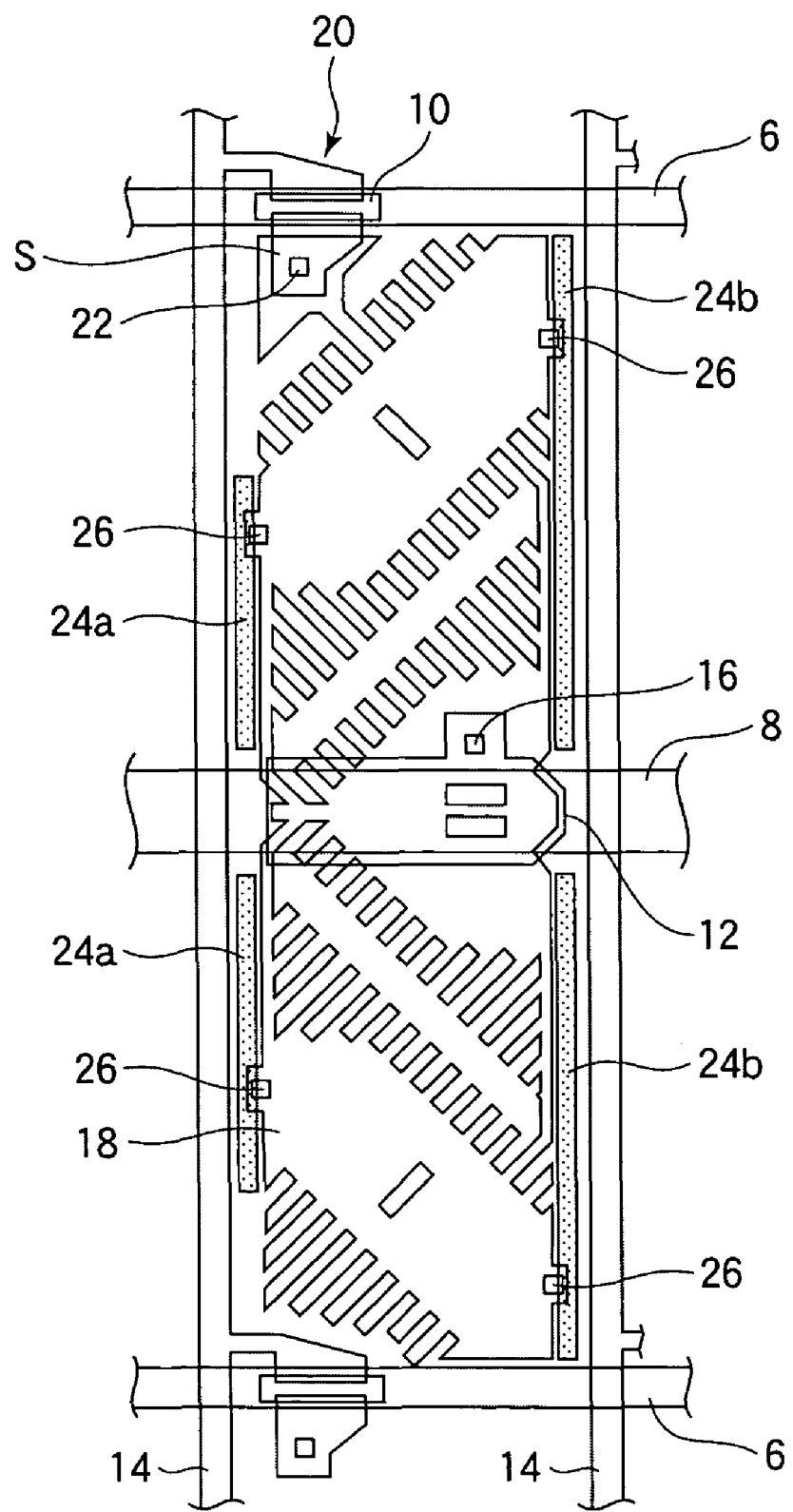
FIG. 2 is a view illustrating a plane layout of the pixel of the liquid crystal display device according to Example 2 of the first embodiment of the invention.

As shown in FIG. 1, first, a metal layer (not shown) is formed on the whole surface of the substrate and is patterned to form gate bus lines (first bus lines) 6 and storage capacitor bus lines 8. Next, a gate-insulating film (not shown), an operation semiconductor layer and a channel protection film (none of which are shown) are formed on the whole surface of the substrate on the gate bus lines 6 and on the storage capacitor bus lines 8. The operation semiconductor layer and the channel protection film 10 are patterned on the gate bus lines 6. Here, the gate-insulating film is formed on the whole surface of the substrate.

In the conventional liquid crystal display device, next, an n+ semiconductor layer and a metal layer (both of which are not shown) are formed on the whole surface of the substrate on the gate-insulating film, the operation semiconductor layer and on the channel protection film 10, and are patterned thereby to form a source electrode S, a storage capacitor electrode 12 and data bus lines (second bus lines) 14. Next, a protection film (not shown) is formed on the whole surface of the substrate on the source electrode S, the storage capacitor electrode 12 and on the data bus lines 14. Next, the protection film is removed by etching from the portions thereof on the storage capacitor electrode 12 and on the source electrode S to form contact holes 16 and 22. Next, a pixel electrode 18 is formed by using a transparent material. The pixel electrode 18 is electrically connected to the storage capacitor electrode (upper electrode of storage capacitor) 12 and to the source electrode S via the contact holes 16 and 22.

As described above, a parasitic capacitance Cds takes place between the data bus line 14 and the pixel electrode 18 formed by using different exposing masks. Due to the dispersion in the precision of exposure, therefore, the positions of exposure for the data bus line 14 and the pixel electrode 18 are deviated on the substrate, and the distance between the data bus line 14 and the pixel electrode 18 varies from a desired distance. If the above variation occurs on the display region, and the distance between the data bus line 14 and the pixel electrode 18 exceeds a predetermined allowable range, then, shading occurs in the display on the display screen.

In the liquid crystal display device of this embodiment as shown in FIG. 1, therefore, compensation electrodes 24 are formed simultaneously with the data bus lines 14 by being exposed to light in the pixel region on a region where the pixel electrode 18 and the data bus lines 14 are opposed to each other, which region being part of the outer edge regions of the whole pixel electrode 18. That is, the n+ semiconductor layer and the metal layer are formed on the whole surface of the substrate on the gate-insulating film, on the operation semiconductor layer and on the channel protection film 10, and are patterned to form the compensation electrodes 24 simultaneously with the formation of source electrode S, storage capacitor electrode 12 and data bus lines 14. The compensation electrodes 24 are arranged nearly in parallel with the data bus lines 14 neighboring thereto except on the storage capacitor bus line 8.

Next, a protection film (not shown) is formed on the whole surface of the substrate on the source electrode S, on the storage capacitor electrode 12, on the data bus lines 14 and on the compensation electrodes 24. Next, the protection film is removed by etching from the portions thereof on the storage capacitor electrode 12, on the source electrode S and on the compensation electrodes 24 to form contact holes 16, 22 and 26. Next, a pixel electrode 18 is formed by using a transparent material. Therefore, the compensation electrodes 24 are arranged on the region where the data bus lines 14 and the pixel electrode 18 are opposed to each other. The pixel electrode 18 is electrically connected to the storage capacitor electrode 12, source electrode S and compensation electrodes 24 through the contact holes 16, 22 and 26, respectively. When a pixel voltage Vp is applied to the pixel electrode 18, therefore, the compensation electrodes 26 assume the same potential as that of the pixel electrode 18.

Figure 10:
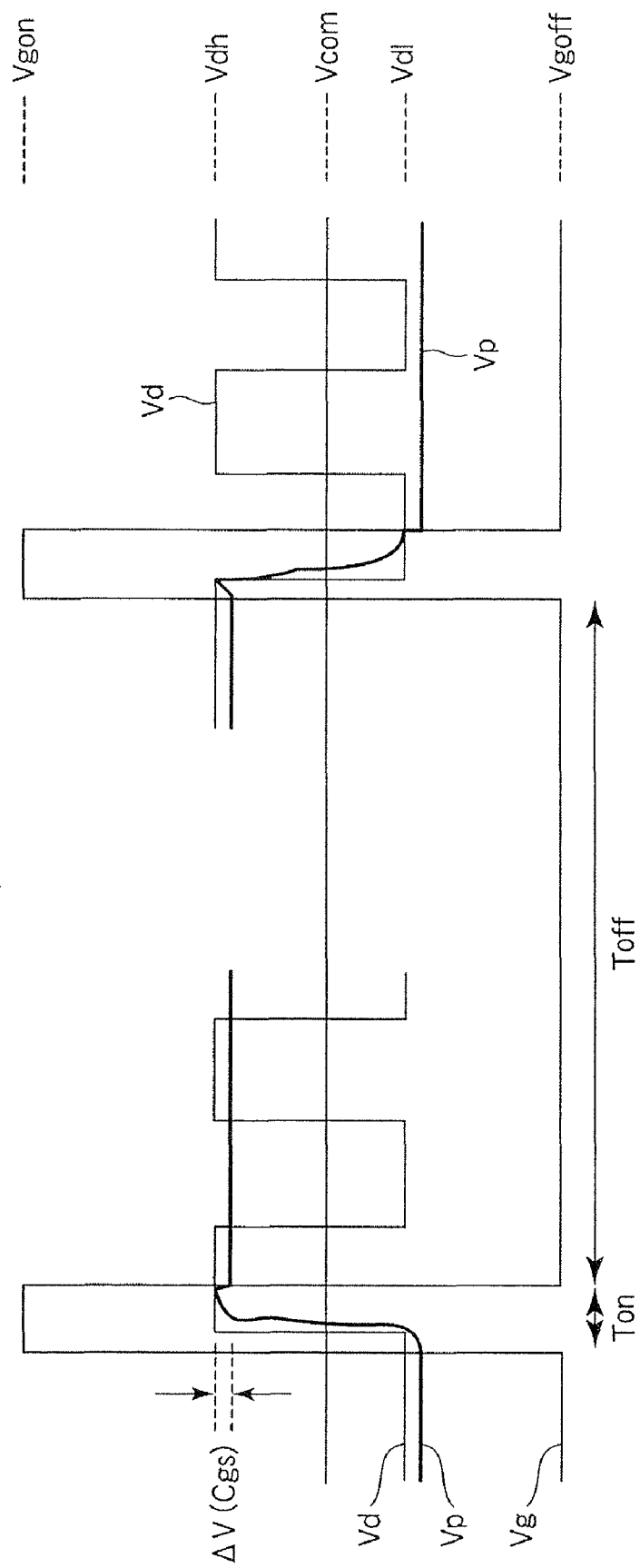
FIG. 10 is a diagram illustrating voltage waveforms applied to the pixel of the conventional liquid crystal display device.
Figure 11:
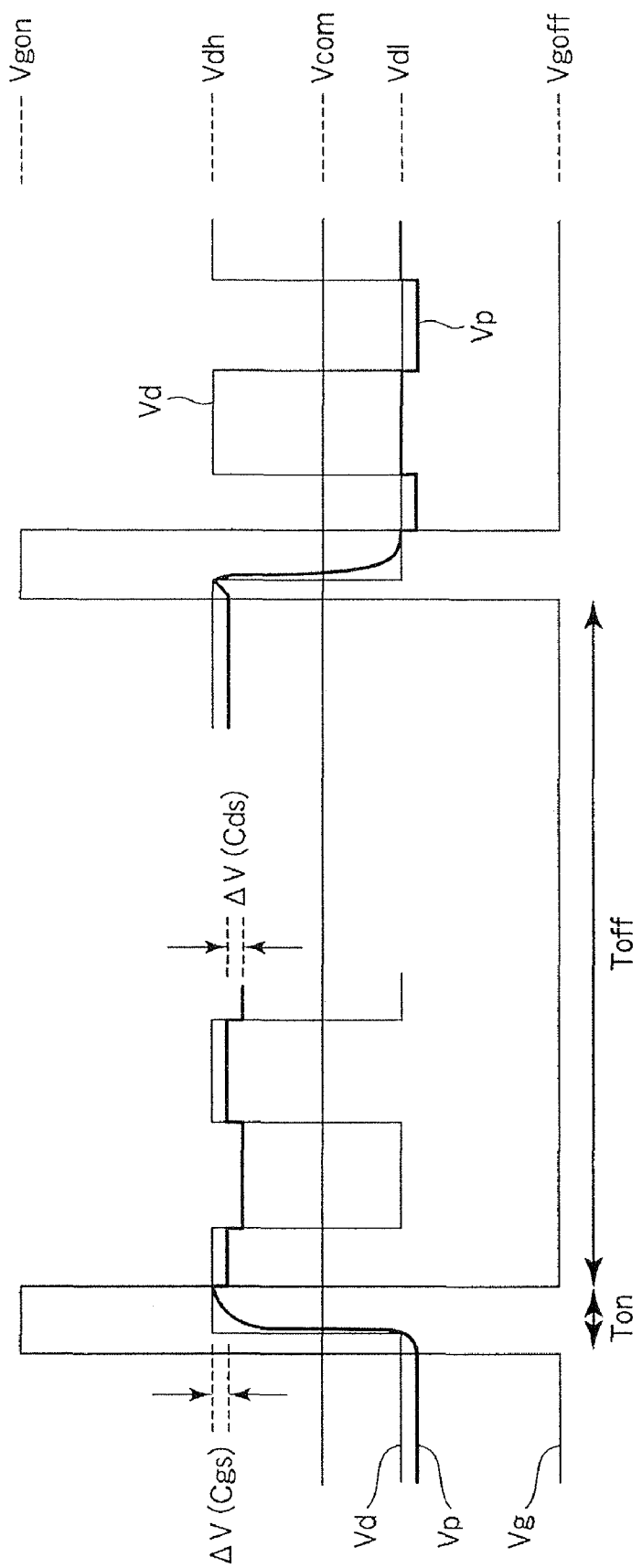
FIG. 11 is a diagram illustrating voltage waveforms applied to the pixel of the conventional liquid crystal display device.
Figure 12:
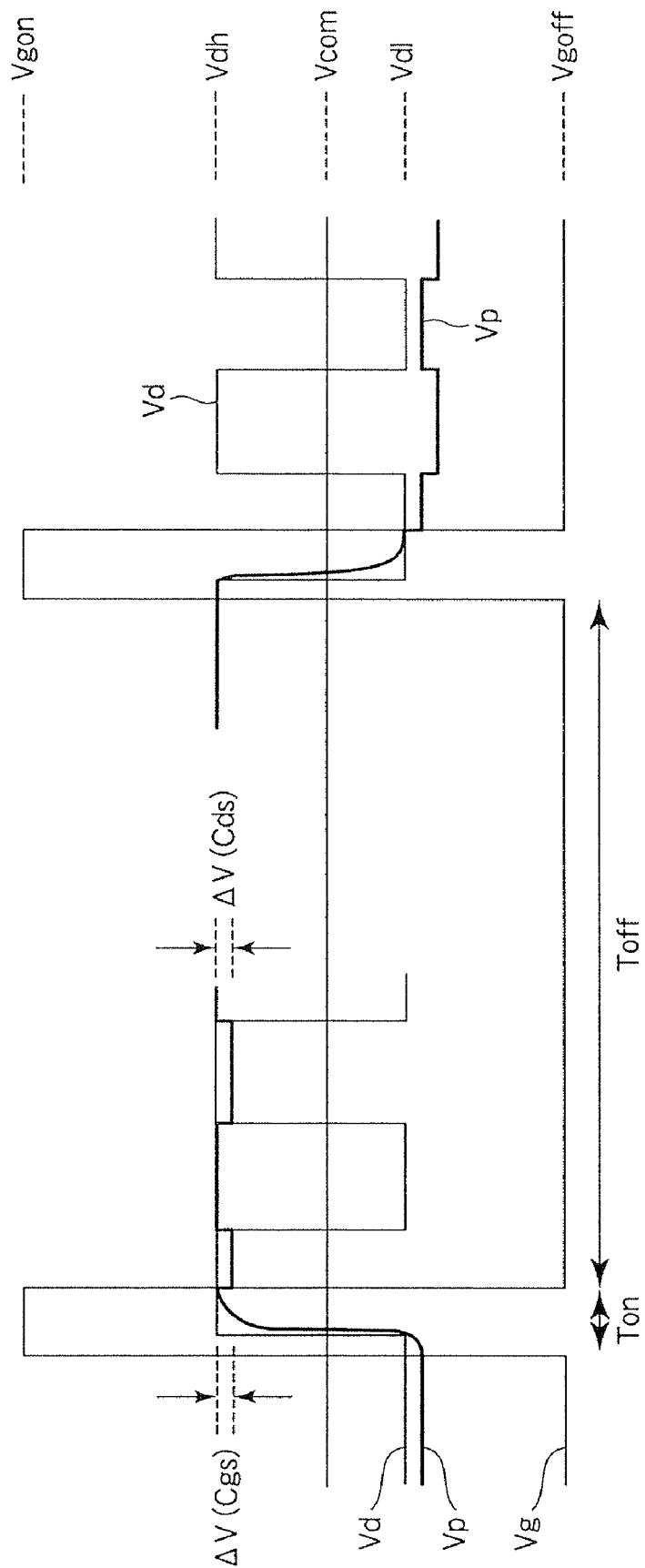
FIG. 12 is a diagram illustrating voltage waveforms applied to the pixel of the conventional liquid crystal display device.

In the liquid crystal display device according to this embodiment, a parasitic capacitance Cds takes place between the data bus lines 14 and the compensation electrodes 24 simultaneously formed by using the same exposing mask. Therefore, the parasitic capacitance Cds does not vary despite there is a change in the distance between the data bus lines 14 and the pixel electrode 18 that is caused by variation in the positions for exposing the data bus lines 14 and the pixel electrode 18 on the substrate that stems from dispersion in the precision of exposure. The distance between the data bus lines 14 and the compensation electrodes 24 remains nearly constant in the whole display region. Therefore, even when the data signal voltages Vd of opposite polarities are applied to the neighboring data bus lines 14, the pixel voltage Vp remains nearly constant in the non-selection period Toff as shown in FIG. 10, and there occurs no shading in the display on the display screen. Thus, the occurrence of shading in the display is prevented despite of deviation in the positions of patterns of the data bus lines 14 or the pixel electrodes 18, and there is realized a liquid crystal display device featuring a high quality.

Example 1

A liquid crystal display device according to Example 1 of this embodiment and a method of its production will be described with reference to FIG. 1 again. First, a laminate of Al, MoN and Mo films is formed on the whole surface of a glass substrate, is patterned, and is wet-etched to form gate bus lines 6 and a storage capacitor bus line 8. Next, a laminate of a gate-insulating SiN film (not shown), an operation semiconductor a-Si film (not shown) and a channel protection SiN film (not shown) is formed on the whole surface of the substrate on the gate bus lines 6 and on the storage capacitor bus line 8, and a channel protection film 10 is patterned on the gate bus lines 6. Here, the gate-insulating SiN film and the operation semiconductor a-Si film are formed on the whole surface of the substrate.

Next, an $n^+$ semiconductor layer $n^+$a-Si film and a laminate of Ti, Al and Ti films, are formed on the whole surface of the substrate on the patterns of gate-insulating film, operation semiconductor a-Si film and channel protection film 10, and are patterned. Here, the compensation electrodes 24 are so patterned as to be opposed to the data bus lines 6. The operation semiconductor a-Si film, $n^+$ semiconductor $n^+$a-Si film and the laminate of Ti, Al and Ti films, are dry-etched to form the source electrode S, storage capacitor electrode 12, data bus lines 14 and compensation electrodes 24. Next, a protection SiN film is formed on the whole surface of the substrate on the source electrode S, on the storage capacitor electrode 12, on the data bus lines 14 and on the compensation electrodes 24. Next, the protection SiN film is removed by etching from the portions thereof on the storage capacitor electrode 12, source electrode S and compensation electrodes 24 to form contact holes 16, 22 and 26.

Next, a pixel electrode 18 is formed by using a transparent material ITO. Here, the pixel electrode 18 is arranged being separated away by a predetermined distance from the data bus lines 14 so will not to completely cover the compensation electrodes 24. The pixel electrode 18 is electrically connected to the storage capacitor electrode 12, source electrode S and compensation electrodes 24 via the contact holes 16, 22 and 26.

A parasitic capacitance Cds takes place between the data bus lines 14 and the compensation electrodes 24 arranged neighboring and opposing the data bus lines 14. The data bus lines 14 and the compensation electrodes 24 are simultaneously patterned by being exposed to light. Therefore, the distance between the data bus lines 14 and the compensation electrodes 24 remains nearly constant irrespective of the precision of exposure. Therefore, the parasitic capacitance Cds does not vary even when the distance between the data bus lines 14 and the pixel electrode 18 varies for every region due to deviation in positions of exposure for the data bus lines 14 and the pixel electrode 18. Therefore, there is seen almost no shading in the display on the display screen, and there is realized a liquid crystal display device of a high quality.

Example 2

Next, the liquid crystal display device according to Example 2 of the embodiment will be described with reference to FIG. 2. In the above Example 1, the compensation electrodes 24 formed on both sides of the pixel electrode 18 have nearly the same length. In this Example, on the other hand, a feature resides in that the compensation electrodes 24a and 24b of different lengths are formed on both sides of the pixel electrode 18. Referring to FIG. 2, parasitic capacitances Cds take place among the pixel electrode 18 and the compensation electrodes 24a, 24b even when the length of the compensation electrode 24a is not the same as the length of the compensation electrode 24b. However, the parasitic capacitances Cds remain nearly constant on the display regions, and no shading occurs in the display.

Further, unlike the compensation electrode 24b, the compensation electrode 24a needs not be formed on the whole region where the data bus line 14 is opposed to the pixel electrode 18. In this case, the parasitic capacitances Cds take place between the data bus line 14 and the compensation electrode 24a, and between the data bus line 14 and the pixel electrode 18. Therefore, there may occur shading in the display due to deviation in the positions of the data bus line 14 and the pixel electrode 18. However, the region where the data bus line 14 is opposed to the pixel electrode 18, becomes smaller than the region of the conventional liquid crystal display device without the compensation electrode. Therefore, the shading in the display decreases to such a degree that it cannot be almost seen, and there arouses no problem in practice.

According to this embodiment as described above, the capacitance value of the parasitic capacitance Cds does not vary despite the distance varies between the data bus line 14 and the pixel electrode 18 due to deviation in the positions of exposure for the data bus line 14 and the pixel electrode 18. Therefore, there is obtained the same effect as that of Example 1.

Second Embodiment

Figure 3:
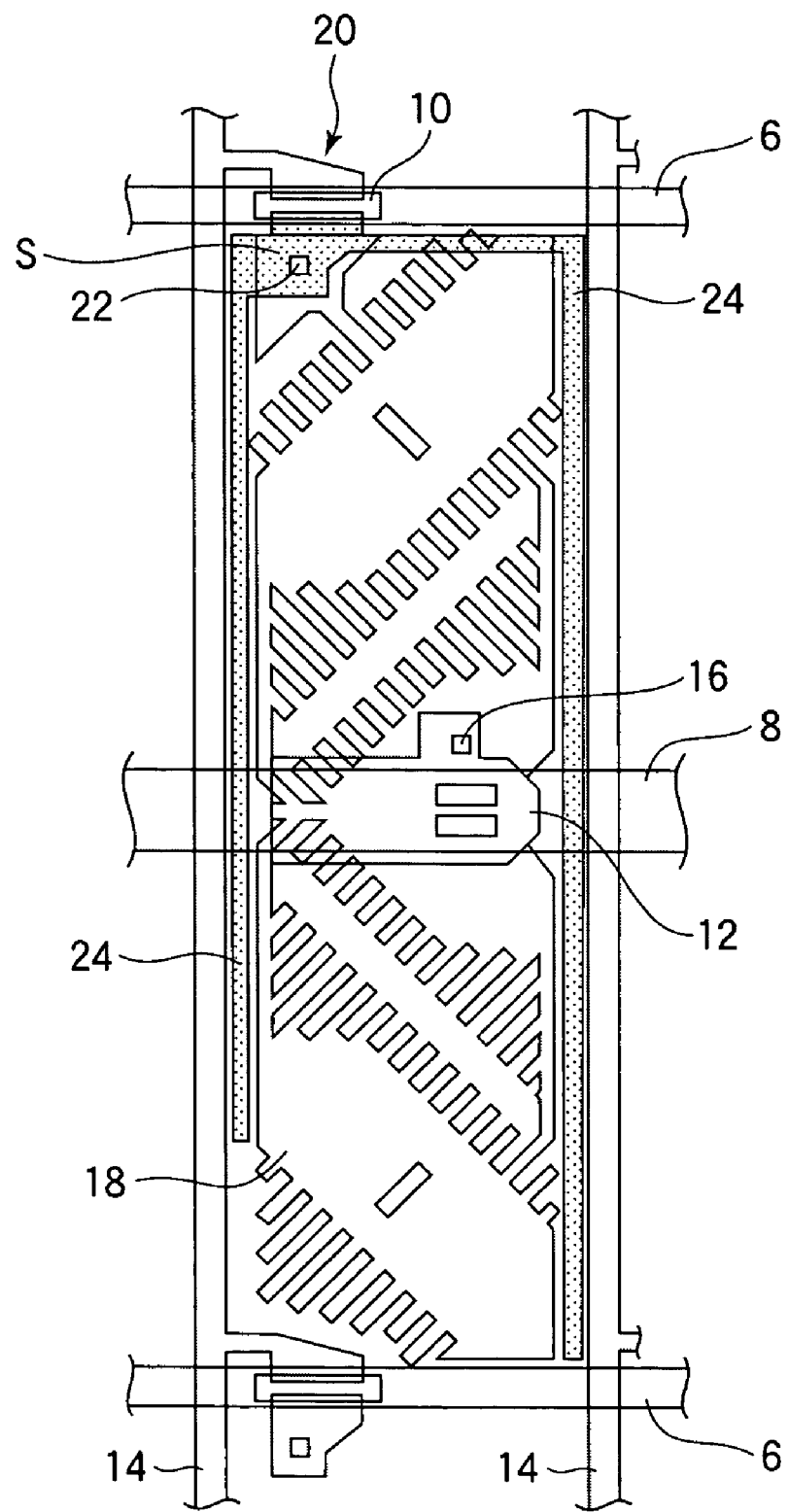
FIG. 3 is a view illustrating a plane layout of the pixel of the liquid crystal display device according to a second embodiment of the invention.

The liquid crystal display device according to a second embodiment of the invention will now be described with reference to FIG. 3. In the liquid crystal display device of the above embodiment, the compensation electrodes 24, 24a, 24b are connected to the pixel electrode 18 through the contact hole 26 so as to assume the same potential as the pixel electrode 18. In the liquid crystal display device of this embodiment, on the other hand, a feature resides in that the source electrode and the compensation electrode are formed in a continuing pattern, so that these two electrodes assume the same potential.

Schematic constitution of a pixel in the liquid crystal display device according to this embodiment and a method of its production will now be described with reference to FIG. 3 which is a view illustrating a plane layout of the pixel of the liquid crystal display device according to this embodiment. First, a laminate (not shown) of Al, MoN and Mo films is formed on the whole surface of a glass substrate, is patterned, and is wet-etched to form gate bus lines 6 and a storage capacitor bus line 8. Next, a laminate (not shown) of a gate-insulating SiN film, an operation semiconductor a-Si film and a channel protection SiN film is formed on the whole surface of the substrate on the gate bus lines 6 and on the storage capacitor bus line 8, and a channel protection film 10 is patterned on the gate bus lines 6. Here, the gate-insulating SiN film and the operation semiconductor a-Si film are formed on the whole surface of the substrate.

Next, an $n^+$ semiconductor $n^+$a-Si film and a laminate of Ti, Al and Ti films, are formed on the whole surface of the substrate on the patterns of gate-insulating film, operation semiconductor a-Si film and channel protection film 10, and are patterned. Here, the source electrode S is extended so as to be opposed to the data bus lines 14, and parts of the source electrode S are used as the compensation electrodes 24. Next, the operation semiconductor a-Si film, $n^+$ semiconductor $n^+$a-Si film and the laminate of Ti, Al and Ti films, are dry-etched to form a source electrode S, compensation electrodes 24 in a pattern continuing to the source electrode S, storage capacitor electrode 12 and data bus lines 14. Next, a protection SiN film is formed on the whole surface of the substrate on the source electrode S, on the storage capacitor electrode 12 and on the data bus lines 14.

Next, the protection SiN film is removed by etching from the portions thereof on the storage capacitor electrode 12 and on the source electrode S to thereby form contact holes 16 and 22. Next, a pixel electrode 18 is formed by using a transparent material ITO. Here, the pixel electrode 18 is arranged being separated away by a predetermined distance from the data bus lines 14 so will not to completely cover the compensation electrodes 24. The pixel electrode 18 is electrically connected to the storage capacitor electrode 12 and the source electrode S via the contact holes 16 and 22, respectively.

A parasitic capacitance Cds takes place between the data bus line 14 and the compensation electrode 24 opposed to the data bus line 14 that is formed in a pattern continuing to the source electrode S. The data bus line 14 and the source electrode S (compensation electrode 24) are simultaneously patterned by being exposed to light. Therefore, the distance between the data bus line 14 and the source electrode S (compensation electrode 24) remains nearly constant irrespective of the precision of exposure. Therefore, the capacitance value of the parasitic capacitance Cds does not vary even when the distance between the data bus line 14 and the pixel electrode 18 varies for every region due to deviation in positions of exposure for the data bus line 14 and the pixel electrode 18. Therefore, there is obtained the effect similar to that of the above-mentioned embodiment.

Third Embodiment

Figure 4:
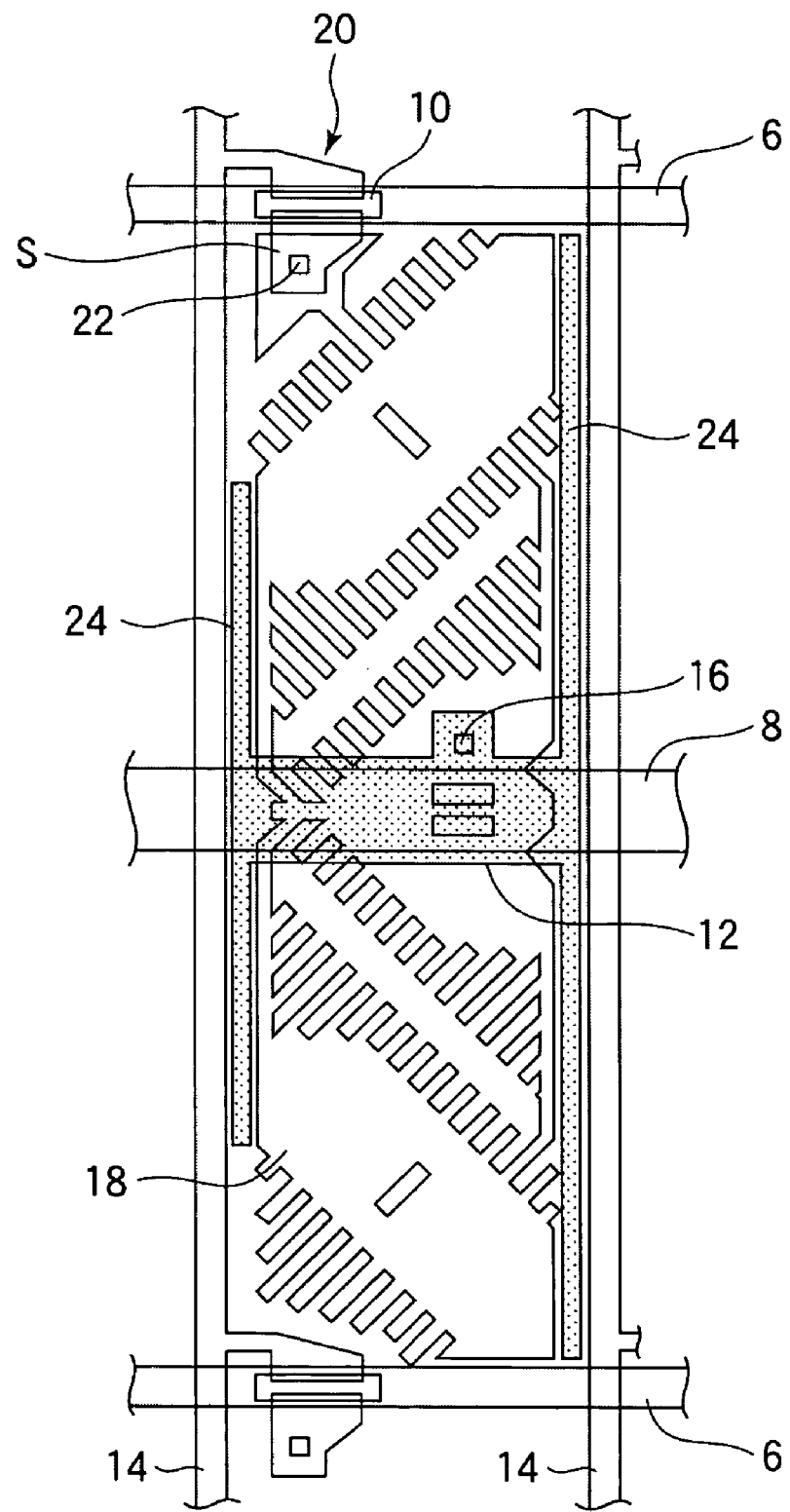
FIG. 4 is a view illustrating a plane layout of the pixel of the liquid crystal display device according to a third embodiment of the invention.

The liquid crystal display device according to a third embodiment of the invention will now be described with reference to FIG. 4. In the liquid crystal display device of the above embodiment, the compensation electrodes 24, 24a, 24b are connected to the pixel electrode 18 through the contact holes 26 so as to assume the same potential as that of the pixel electrode 18. In the liquid crystal display device of this embodiment, on the other hand, a feature resides in that the storage capacitor electrode and the compensation electrode are formed in a continuing pattern, so that compensation electrodes and the pixel electrode assume the same potential.

Schematic constitution of a pixel in the liquid crystal display device according to this embodiment and a method of its production will now be described with reference to FIG. 4 which is a view illustrating a plane layout of the pixel of the liquid crystal display device according to this embodiment. First, a laminate of Al, MoN and Mo films is formed on the whole surface of a glass substrate, is patterned, and is wet-etched to form gate bus lines 6 and a storage capacitor bus line 8. Next, a laminate (not shown) of a gate-insulating SiN film, an operation semiconductor a-Si film and a channel protection SiN film is formed on the whole surface of the substrate on the gate bus lines 6 and on the storage capacitor bus line 8, and a channel protection film 10 is patterned on the gate bus lines 6. Here, the gate-insulating SiN film and the operation semiconductor a-Si film are formed on the whole surface of the substrate.

Next, an $n^+$ semiconductor $n^+$a-Si film and a laminate (not shown) of Ti, Al and Ti films, are formed on the whole surface of the substrate on the patterns of gate-insulating film, operation semiconductor a-Si film and channel protection film 10, and are patterned. Here, the storage capacitor electrode 12 is extended so as to be opposed to the data bus lines 14, and parts of the storage capacitor electrode 12 are used as the compensation electrodes 24. The operation semiconductor a-Si film, $n^+$ semiconductor $n^+$a-Si film and the laminate of Ti, Al and Ti films, are dry-etched to form a source electrode S, a storage capacitor electrode 12, compensation electrodes 24 of a pattern continuing to the storage capacitor electrode 12, and data bus lines 14.

Next, a protection SiN film is formed on the whole surface of the substrate on the source electrode S, on the compensation electrodes 24, on the storage capacitor electrode 12 and on the data bus lines 14. Next, the protection film is removed by etching from the portions thereof on the storage capacitor electrode 12 and on the source electrode S to thereby form contact holes 16 and 22. Next, a pixel electrode 18 is formed by using a transparent material ITO. Here, the pixel electrode 18 is arranged being separated away by a predetermined distance from the data bus lines 14 so will not to completely cover the compensation electrodes 24. The pixel electrode 18 is electrically connected to the storage capacitor electrode 12 and the source electrode S via the contact holes 16 and 22.

A parasitic capacitance Cds takes place between the data bus line 14 and the compensation electrode 24 opposed to the data bus line 14 that is formed in a pattern continuing to the storage capacitor electrode 12. The data bus line 14 and the storage capacitor electrode 12 (compensation electrode 24) are simultaneously patterned by being exposed to light. Therefore, the distance between the data bus line 14 and the storage capacitor electrode 12 (compensation electrode 24) remains nearly constant irrespective of the precision of exposure. Therefore, the capacitance value of the parasitic capacitance Cds does not vary even when the distance between the data bus line 14 and the pixel electrode 18 varies for every region due to deviation in positions of exposure for the data bus lines 14 and the pixel electrode 18. Therefore, there is obtained the effect similar to that of the above-mentioned embodiment.

Fourth Embodiment

Figure 5:
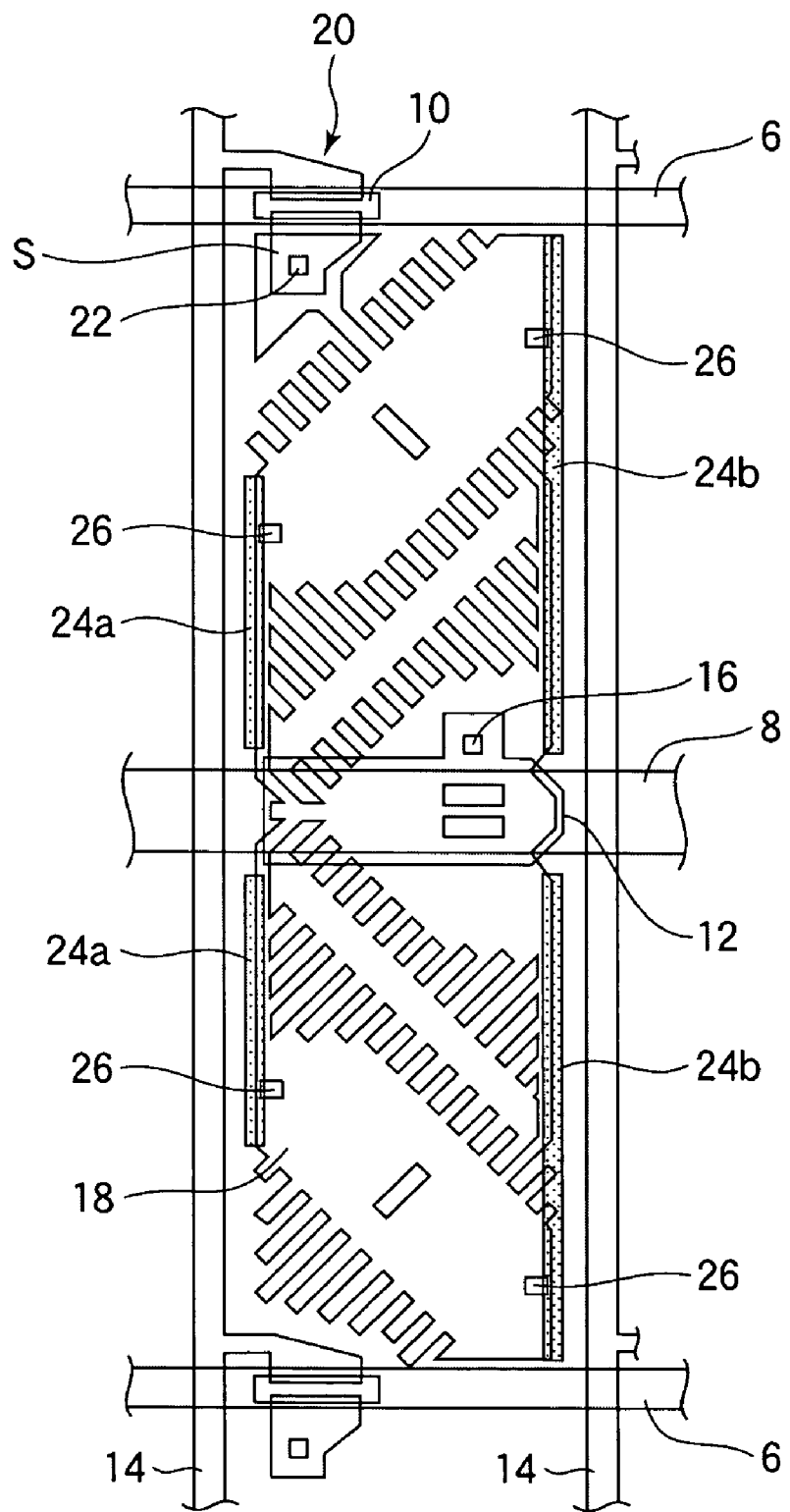
FIG. 5 is a view illustrating a plane layout of the pixel of the liquid crystal display device according to a fourth embodiment of the invention.

The liquid crystal display device according to a fourth embodiment of the invention will now be described with reference to FIG. 5. In the liquid crystal display devices of the above first to third embodiments, the compensation electrodes 24 are arranged being separated away by a predetermined distance from the data bus lines 14 so will not to be completely covered with the pixel electrode 18. When the pixel electrode 18 and the compensation electrodes 24 are not overlapped one upon the other, however, there arouse problems such as leakage of light between the pixel electrode 18 and the compensation electrodes 24, and loss of stability in the orientation of the liquid crystals. In the liquid crystal display device of this embodiment, therefore, a feature resides in that the compensation electrodes and the pixel electrode are overlapped being separated away by a predetermined distance.

Schematic constitution of a pixel in the liquid crystal display device according to this embodiment and a method of its production will now be described with reference to FIG. 5 which is a view illustrating a plane layout of the pixel of the liquid crystal display device according to this embodiment. First, a laminate (not shown) of Al, MoN and Mo films is formed on the whole surface of a glass substrate, is patterned, and is wet-etched to form gate bus lines 6 and a storage capacitor bus line 8. Next, a laminate (not shown) of a gate-insulating SiN film, an operation semiconductor a-Si film and a channel protection SiN film is formed on the whole surface of the substrate on the gate bus lines 6 and on the storage capacitor bus line 8, and the channel protection film 10 is patterned on the gate bus lines 6. Here, the gate-insulating SiN film and the operation semiconductor a-Si film are formed on the whole surface of the substrate.

Next, an $n^+$ semiconductor $n^+$a-Si film and a laminate of Ti, Al and Ti films, are formed on the whole surface of the substrate on the patterns of gate-insulating SiN film, operation semiconductor a-Si film and channel protection film 10, and are patterned. Here, the compensation electrodes 24a and 24b are so patterns as to be opposed to the data bus lines 14. For example, the compensation electrode 24a is patterned to be shorter than the compensation electrode 24b. Next, the operation semiconductor a-Si film, $n^+$ semiconductor $n^+$a-Si film and the laminate of Ti, Al and Ti films, are dry-etched to form a source electrode S, a storage capacitor electrode 12, compensation electrode 24a, 24b, and data bus lines 14.

Next, a protection SiN film is formed on the whole surface of the substrate on the source electrode S, on the storage capacitor electrode 12, on the compensation electrodes 24a and 24b, and on the data bus lines 14. Next, the protection film is removed by etching from the portions thereof on the storage capacitor electrode 12, on the source electrode S and on the compensation electrodes 24a and 24b to thereby form contact holes 16, 22 and 26. Next, a pixel electrode 18 is formed by using a transparent material ITO. Here, the compensation electrodes 24a and 24b are arranged so as to be overlapped on the pixel electrode 18 being separated away by a predetermined distance. The pixel electrode 18 is electrically connected to the storage capacitor electrode 12, source electrode S and compensation electrodes 24a and 24b via the contact holes 16, 22 and 26, respectively.

There is no gap among the compensation electrodes 24a, 24b and the pixel electrode 18, and there arouses no problem such as leakage of light or abnormal orientation of liquid crystal molecules. Parasitic capacitances Cds take place among the data bus lines 14 and the compensation electrodes 24a, 24b. The data bus lines 14 and the compensation electrode 24a, 24b are simultaneously patterned by being exposed to light. Therefore, the distance between the data bus lines 14 and the compensation electrodes 24a, 24b remains nearly constant irrespective of the precision of exposure. Therefore, the capacitance value of the parasitic capacitances Cds do not vary even when the distance between the data bus lines 14 and the pixel electrode 18 varies due to deviation in positions of exposure for the data bus lines 14 and the pixel electrode 18. Therefore, there is obtained the effect similar to that of the above-mentioned embodiments.

Fifth Embodiment

Figure 6:
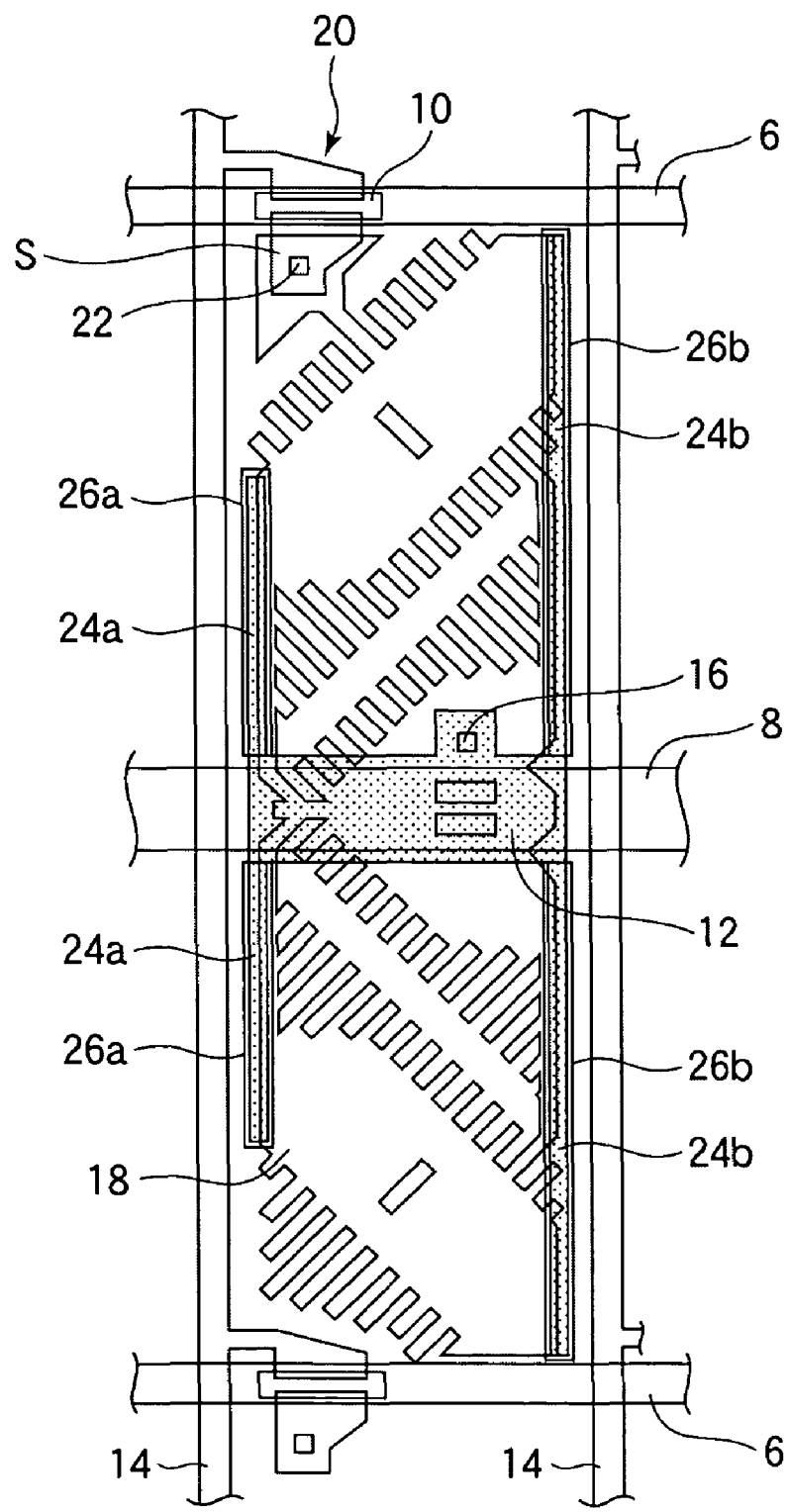
FIG. 6 is a view illustrating a plane layout of the pixel of the liquid crystal display device according to fifth to ninth embodiments of the invention.

The liquid crystal display device according to a fifth embodiment of the invention will now be described with reference to FIG. 6. In the liquid crystal display device of the above fourth embodiment, the compensation electrodes 24a and 24b are formed simultaneously with the data bus lines 14 by using the same material. Therefore, the regions where the compensation electrodes 24a, 24b are overlapped on the pixel electrode 18 become light-shielding regions accounting for a cause of drop in the aperture ratio of the pixel. In the liquid crystal display device of this embodiment, on the other hand, a feature resides in that the compensation electrodes are formed by using a transparent material to prevent a drop in the aperture ratio of the pixels.

Schematic constitution of a pixel in the liquid crystal display device according to this embodiment and a method of its production will now be described with reference to FIG. 6 which is a view illustrating a plane layout of the pixel of the liquid crystal display device according to this embodiment. First, a laminate (not shown) of Al and Ti films is formed on the whole surface of a glass substrate, is patterned, and is dry-etched to form gate bus lines 6 and a storage capacitor bus line 8. Next, a laminate (not shown) of a gate-insulating SiN film, an operation semiconductor a-Si film and a channel protection SiN film is formed on the whole surface of the substrate on the gate bus lines 6 and on the storage capacitor bus line 8, and a channel protection layer 10 is patterned on the gate bus lines 6. Here, the gate-insulating SiN film and the operation semiconductor a-Si film are formed on the whole surface of the substrate.

Next, an $n^+$ semiconductor $n^+$a-Si film and a laminate of Ti, Al, MoN and Mo films are formed on the whole surface of the substrate on the gate-insulating SiN film, the operation semiconductor a-Si film and pattern of the channel protection layer 10, and are patterned. Here, the Ti film has a thickness of about 40 nm. The storage capacitor electrode 12 is stretched so as to be opposed to the data bus lines 14, and parts of the storage capacitor electrode 12 are used as compensation electrodes 24a and 24b. The laminate of Al, MoN and Mo films is wet-etched, while the operation semiconductor a-Si film, $n^+$ semiconductor $n^+$a-Si film and the Ti film are dry-etched, to form a source electrode S, storage capacitor electrode 12, compensation electrode 24a and 24b of a pattern continuing to the storage capacitor electrode 12, and data bus lines 14.

Next, a protection SiN film is formed on the whole surface of the substrate on the source electrode S, on the storage capacitor electrode 12, on the compensation electrodes 24a and 24b, and on the data bus lines 14. Next, the protection SiN film is removed by etching from the portions thereof on the storage capacitor electrode 12, on part of the source electrode S and on the whole surfaces of the compensation electrodes 24a and 24b to thereby form contact holes 16, 22, 26a and 26b. Next, the laminate of Al, MoN and Mo layers is removed by wet-etching from inside of the contact holes 16, 22, 26a and 26b.

Next, a pixel electrode 18 is formed by using a transparent material ITO. Here, the compensation electrodes 24a and 24b are overlapped on the pixel electrode 18 being separated away therefrom by a predetermined distance. The pixel electrode 18 is electrically connected to the storage capacitor electrode 12, source electrode S and compensation electrodes 24a and 24b via the contact holes 16, 22, 26a and 26b, respectively. The compensation electrodes 24a and 24b are formed by the operation semiconductor a-Si film, $n^+$ semiconductor $n^+$a-Si film and Ti film, and possess an improved transmission factor. This prevents a drop in the aperture ratio of the pixels despite the compensation electrodes 24a and 24b are overlapped on the pixel electrode 18.

Parasitic capacitances Cds take place among the data bus lines 14 and the compensation electrodes 24a, 24b. The data bus lines 14 and the compensation electrodes 24a, 24b are simultaneously patterned by being exposed to light. Therefore, the distance between the data bus lines 14 and the compensation electrodes 24a, 24b remains nearly constant irrespective of the precision of exposure. Therefore, the capacitance value of the parasitic capacitances Cds do not vary even when the distance between the data bus lines 14 and the pixel electrode 18 varies for each region due to deviation in positions of exposure for the data bus lines 14 and the pixel electrode 18. Therefore, there is obtained the effect similar to that of the above-mentioned embodiments.

Sixth Embodiment

The liquid crystal display device according to a sixth embodiment of the invention will now be described. The liquid crystal display device of this embodiment has a feature in that the material forming the compensation electrodes is different from that of the liquid crystal display device of the above fifth embodiment. The liquid crystal display device of this embodiment has a pixel structure same as that of the liquid crystal display device of the above fifth embodiment. Therefore, described below with reference to FIG. 6 are the schematic constitution of the pixel and the method of its production. First, a laminate (not shown) of Al and Ti films is formed on the whole surface of a glass substrate, is patterned, and is dry-etched to form gate bus lines 6 and a storage capacitor bus line 8.

Next, a laminate (not shown) of a gate-insulating SiN film, an operation semiconductor a-Si film and a channel protection SiN film is formed on the whole surface of the substrate on the gate bus lines 6 and on the storage capacitor bus line 8, and a channel protection layer 10 is patterned on the gate bus lines 6. Here, the gate-insulating SiN film and the operation semiconductor a-Si film are formed on the whole surface of the substrate. Next, an $n^+$ semiconductor $n^+$a-Si film and a laminate of MoN, Al, MoN and Mo films are formed on the whole surface of the substrate on the gate-insulating SiN film, the operation semiconductor a-Si film and pattern of the channel protection layer 10, and are patterned. Here, the storage capacitor electrode 12 is stretched so as to be opposed to the data bus lines 14, and parts of the storage capacitor electrode 12 are used as compensation electrodes 24a and 24b.

The laminate of MoN, Al, MoN and Mo films is wet-etched, while the laminate of operation semiconductor a-Si film and $n^+$ semiconductor $n^+$a-Si film is dry-etched, to form a source electrode S, storage capacitor electrode 12, compensation electrode 24a and 24b of a pattern continuing to the storage capacitor electrode 12, and data bus lines 14. Next, a protection SiN film is formed on the whole surface of the substrate on the source electrode S, on the storage capacitor electrode 12, on the compensation electrodes 24a and 24b, and on the data bus lines 14.

Next, the protection SiN film is removed by etching from the portions thereof on part of the storage capacitor electrode 12, on part of the source electrode S and on the whole surfaces of the compensation electrodes 24a and 24b to thereby form contact holes 16, 22, 26a and 26b. Next, the laminate of MoN, Al, MoN and Mo films is removed by wet-etching from inside the contact holes 16, 22, 26a and 26b. Next, a pixel electrode 18 is formed by using a transparent material ITO. Here, the compensation electrodes 24a and 24b are overlapped on the pixel electrode 18 being separated away therefrom by a predetermined distance. The pixel electrode 18 is electrically connected to the storage capacitor electrode 12, source electrode S and compensation electrodes 24a and 24b via the contact holes 16, 22, 26a and 26b, respectively. The compensation electrodes 24a and 24b are formed by the laminate of operation semiconductor a-Si film and $n^+$ semiconductor $n^+$a-Si film, and possess an improved transmission factor, exhibiting the same effect as that of the above fifth embodiment.

Seventh Embodiment

The liquid crystal display device according to a seventh embodiment of the invention will be described. The liquid crystal display device of this embodiment has a feature in that the material forming the compensation electrodes is different from that of the liquid crystal display devices of the above fifth and sixth embodiments. The liquid crystal display device of this embodiment has a pixel structure same as that of the liquid crystal display device of the above fifth embodiment. Therefore, described below with reference to FIG. 6 are the schematic constitution of the pixel and the method of its production. First, a laminate of Al and Ti films is formed on the whole surface of a glass substrate, is patterned, and is dry-etched to form gate bus lines 6 and a storage capacitor bus line 8.

Next, a laminate (not shown) of a gate-insulating SiN film, an operation semiconductor a-Si film and an $n^+$ semiconductor $n^+$a-Si film is formed on the whole surface of the substrate on the gate bus lines 6 and on the storage capacitor bus line 8. The operation semiconductor a-Si film and $n^+$ semiconductor $n^+$a-Si film are patterned on the gate bus lines 6 at nearly the same positions and in nearly the same shapes as the channel protection film 10 in the above fifth embodiment. Here, the gate-insulating SiN film is formed on the whole surface of the substrate. Next, a laminate (not shown) of Ti, Al, MoN and Mo films is formed on the whole surface of the substrate on the gate-insulating SiN film, the operation semiconductor a-Si film and pattern of the n+a-Si film, and is patterned. Here, the Ti film is formed maintaining a thickness of about 40 nm. Further, storage capacitor electrode 12 is stretched so as to be opposed to the data bus lines 14, and parts of the storage capacitor electrode 12 are used as compensation electrodes 24a and 24b.

The laminate of Al, MoN and Mo films is wet-etched, while the laminate of operation semiconductor a-Si film, $n^+$ semiconductor $n^+$a-Si film and Ti film is dry-etched, to form a source electrode S, storage capacitor electrode 12, compensation electrode 24a and 24b of a pattern continuing to the storage capacitor electrode 12, and data bus lines 14. Next, a protection SiN film is formed on the whole surface of the substrate on the source electrode S, on the storage capacitor electrode 12, on the compensation electrodes 24a and 24b, and on the data bus lines 14. Next, the protection SiN film is removed by etching from the portions thereof on part of the storage capacitor electrode 12, on part of the source electrode S and on the whole surfaces of the compensation electrodes 24a and 24b to thereby form contact holes 16, 22, 26a and 26b.

Next, the laminate of Al, MoN and Mo films is removed by wet-etching from inside the contact holes 16, 22, 26a and 26b. Next, a pixel electrode 18 is formed by using a transparent material ITO. Here, the compensation electrodes 24a and 24b are arranged so as to be overlapped on the pixel electrode 18 being separated away therefrom by a predetermined distance. The pixel electrode 18 is electrically connected to the storage capacitor electrode 12, source electrode S and compensation electrodes 24a and 24b via the contact holes 16, 22, 26a and 26b, respectively. The compensation electrodes 24a and 24b are formed by the Ti film, and possess an improved transmission factor, exhibiting the same effect as those of the above fifth and sixth embodiments.

Eighth Embodiment

The liquid crystal display device according to an eighth embodiment of the invention will be described. The liquid crystal display device of this embodiment has a feature in that the material forming the compensation electrodes is different from those of the liquid crystal display devices of the above fifth to seventh embodiments. The liquid crystal display device of this embodiment has a pixel structure same as that of the liquid crystal display device of the above fifth embodiment. Therefore, described below with reference to FIG. 6 are the schematic constitution of the pixel and the method of its production. First, a laminate (not shown) of Al and Ti films is formed on the whole surface of a glass substrate, is patterned, and is dry-etched to form gate bus lines 6 and a storage capacitor bus line 8.

Next, a laminate (not shown) of a gate-insulating SiN film, an operation semiconductor a-Si film and a channel protection SiN film is formed on the whole surface of the substrate on the gate bus lines 6 and on the storage capacitor bus line 8, and a channel protection layer 10 is patterned on the gate bus lines 6. Here, the gate-insulating SiN film and the operation semiconductor a-Si film are formed on the whole surface of the substrate. Next, a laminate (not shown) of an $n^+$ semiconductor $n^+$a-Si film and ITO or ZnO and MoN, Al, MoN and Mo films, is formed on the whole surface of the substrate on the patterns of gate-insulating SiN film, operation semiconductor a-Si film and channel protection film 10, and is patterned. Here, the storage capacitor electrode 12 is stretched so as to be opposed to the data bus lines 14, and parts of the storage capacitor electrode 12 are used as compensation electrodes 24a and 24b.

The laminate of ITO or ZnO and MoN, Al, MoN, Mo films is wet-etched, while the laminate of operation semiconductor a-Si film and $n^+$ semiconductor $n^+$a-Si film is dry-etched, to form a source electrode S, storage capacitor electrode 12, compensation electrode 24a and 24b of a pattern continuing to the storage capacitor electrode 12, and data bus lines 14. Next, a protection SiN film is formed on the whole surface of the substrate on the source electrode S, on the storage capacitor electrode 12, on the compensation electrodes 24a and 24b, and on the data bus lines 14. Next, the protection SiN film is removed by etching from the portions thereof on part of the storage capacitor electrode 12, on part of the source electrode S and on the whole surfaces of the compensation electrodes 24a and 24b to thereby form contact holes 16, 22, 26a and 26b. Next, the laminate of MoN, Al, MoN and Mo films is removed by wet-etching from inside the contact holes 16, 22, 26a and 26b.

Next, a pixel electrode 18 is formed by using a transparent material ITO or ZnO. Here, the compensation electrodes 24a and 24b are so arranged as to be overlapped on the pixel electrode 18 being separated away therefrom by a predetermined distance. The pixel electrode 18 is electrically connected to the storage capacitor electrode 12, source electrode S and compensation electrodes 24a and 24b via the contact holes 16, 22, 26a and 26b. The compensation electrodes 24a and 24b are formed by the laminate of operation semiconductor a-Si film, $n^+$ semiconductor $n^+$a-Si film and ITO or ZnO film, and possess an improved transmission factor, exhibiting the same effect as those of the above fifth to seventh embodiments.

Ninth Embodiment

The liquid crystal display device according to a ninth embodiment of the invention will be described. The liquid crystal display device of this embodiment has a feature in that the material forming the compensation electrodes is different from those of the liquid crystal display devices of the above fifth to eighth embodiments. The liquid crystal display device of this embodiment has a pixel structure same as that of the liquid crystal display device of the above fifth embodiment. Therefore, described below with reference to FIG. 6 are the schematic constitution of the pixel and the method of its production. First, a laminate (not shown) of Al and Ti films is formed on the whole surface of a glass substrate, is patterned, and is dry-etched to form gate bus lines 6 and a storage capacitor bus line 8.

Next, a laminate (not shown) of a gate-insulating SiN film, an operation semiconductor a-Si film and an $n^+$ semiconductor $n^+$a-Si film, is formed on the whole surface of the substrate on the gate bus lines 6 and on the storage capacitor bus line 8. The operation semiconductor a-Si film and $n^+$ semiconductor $n^+$a-Si film are patterned on the gate bus lines 6 at nearly the same positions and in nearly the same shapes as the channel protection film 10 in the above fifth embodiment. Here, the gate-insulating SiN film is formed on the whole surface of the substrate. Next, a laminate of ITO or ZnO and MoN, Al, MoN, Mo films is formed on the whole surface of the substrate on the patterns of gate-insulating SiN film, operation semiconductor a-Si film and $n^+$ semiconductor $n^+$a-Si film, and is patterned. Here, the storage capacitor electrode 12 is stretched so as to be opposed to the data bus lines 14, and parts of the storage capacitor electrode 12 are used as compensation electrodes 24a and 24b.

The laminate of ITO or ZnO and MoN, Al, MoN, Mo films is wet-etched to form a source electrode S, storage capacitor electrode 12, compensation electrode 24a and 24b of a pattern continuing to the storage capacitor electrode 12, and data bus lines 14. Next, the laminate of operation semiconductor a-Si film and $n^+$ semiconductor $n^+$a-Si film is dry-etched to form a TFT. Next, a protection SiN film is formed on the whole surface of the substrate on the source electrode S, on the storage capacitor electrode 12, on the compensation electrodes 24a and 24b, and on the data bus lines 14.

Next, the protection SiN film is removed by etching from the portions thereof on part of the storage capacitor electrode 12, on part of the source electrode S and on the whole surfaces of the compensation electrodes 24a and 24b to thereby form contact holes 16, 22, 26a and 26b. Next, the laminate of MoN, Al, MoN and Mo films is removed by wet-etching from inside the contact holes 16, 22, 26a and 26b. Next, a pixel electrode 18 is formed by using a transparent material ITO or ZnO. Here, the compensation electrodes 24a and 24b are arranged so as to be overlapped on the pixel electrode 18 being separated away therefrom by a predetermined distance. The pixel electrode 18 is electrically connected to the storage capacitor electrode 12, source electrode S and compensation electrodes 24a and 24b via the contact holes 16, 22, 26a and 26b, respectively.

The compensation electrodes 24a and 24b are formed by the ITO or ZnO film, and possess an improved transmission factor, exhibiting the same effect as those of the above fifth to eighth embodiments.

Tenth Embodiment

Figure 7:
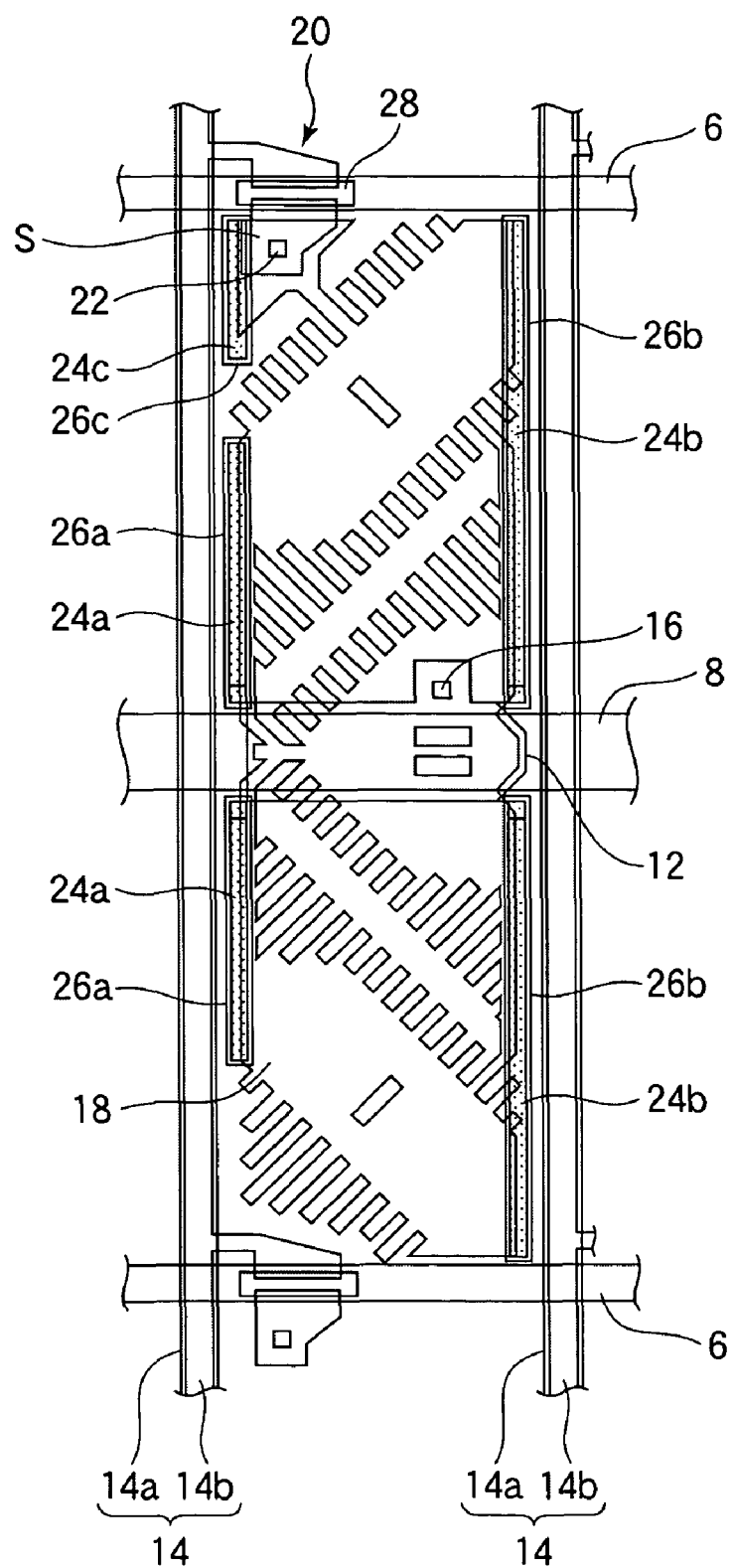
FIG. 7 is a view illustrating a plane layout of the pixel of the liquid crystal display device according to a tenth embodiment of the invention.
Figure 8:
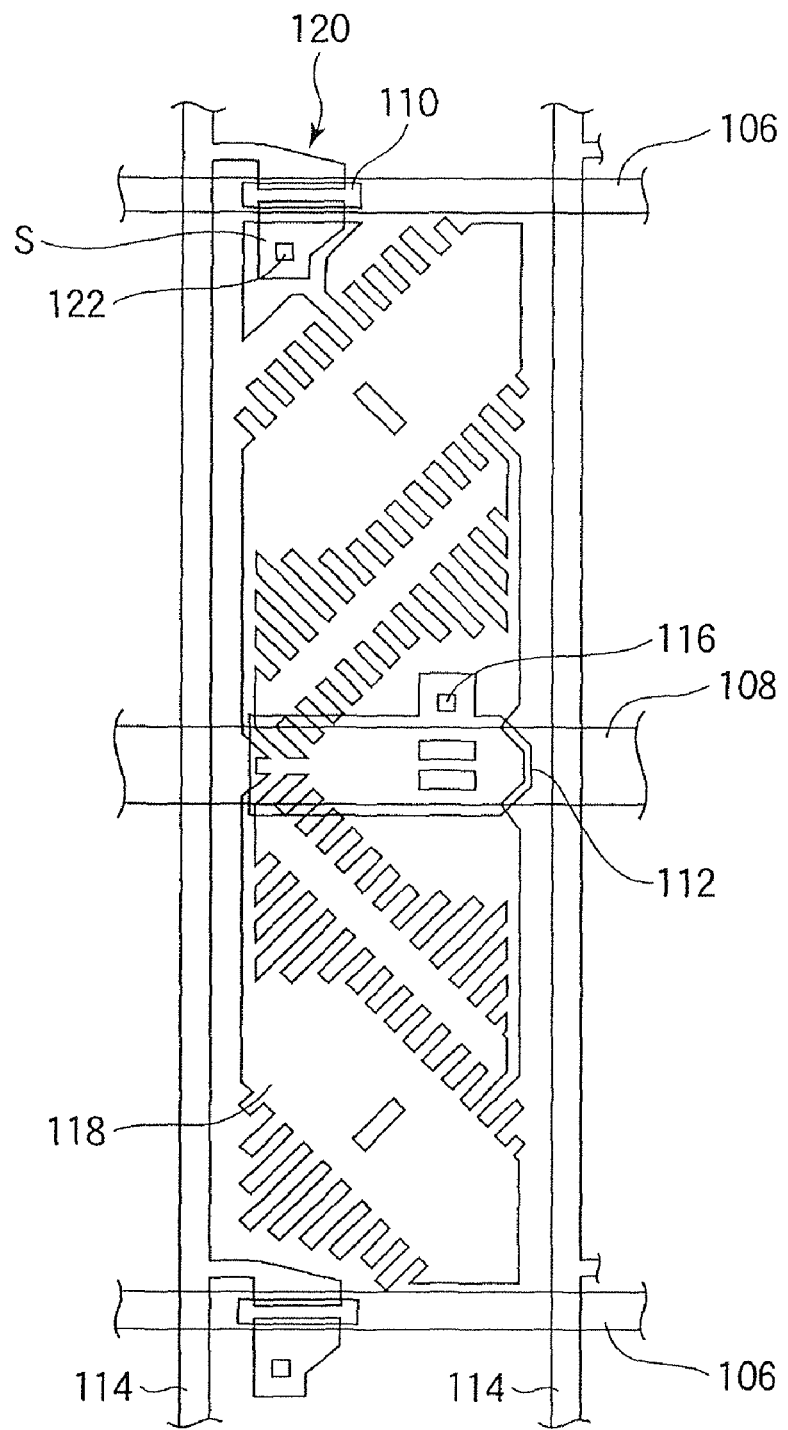
FIG. 8 is a view illustrating a plane layout of a pixel of a conventional liquid crystal display device.
Figure 9:
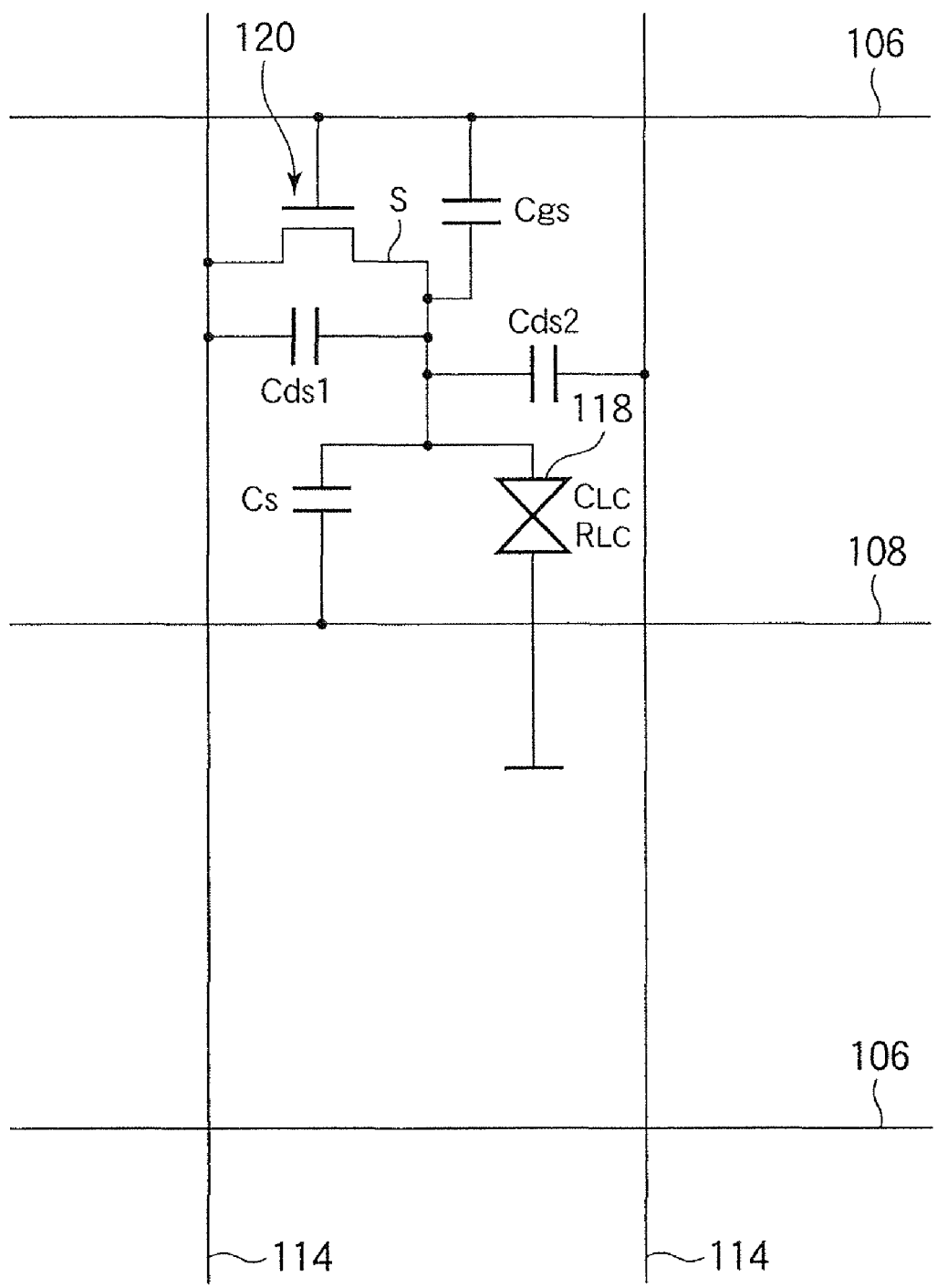
FIG. 9 is a view illustrating an equivalent circuit of a pixel of the conventional liquid crystal display device.

The liquid crystal display device according to a tenth embodiment of the invention will be described with reference to FIG. 7. The liquid crystal display device of this embodiment has a feature in that the material forming the compensation electrodes is different from those of the liquid crystal display devices of the above fifth to ninth embodiments. FIG.

7 is a view illustrating a plane layout of the pixel of the liquid crystal display device according to this embodiment. First, a laminate of Al, MoN and Mo films is formed on the whole surface of a glass substrate, is patterned, and is wet-etched to form gate bus lines 6 and a storage capacitor bus line 8.

Next, a laminate (not shown) of a gate-insulating SiN film, an operation semiconductor a-Si film and an $n^+$ semiconductor $n^+$a-Si film is formed on the whole surface of the substrate on the gate bus lines 6 and on the storage capacitor bus line 8. The operation semiconductor a-Si film and $n^+$ semiconductor $n^+$a-Si film patterns 28 are patterned on the gate bus lines 6. Here, the gate-insulating SiN film is formed on the whole surface of the substrate. Next, the ITO or ZnO film is formed on the whole surface of the substrate on the gate-insulating SiN film and on the operation semiconductor a-Si film and $n^+$ semiconductor $n^+$a-Si film patterns 28, and is patterned. The ITO or ZnO film is wet-etched to form data bus lines 14a and compensation electrodes 24a, 24b and 24c which are so arranged as to be opposed to the data bus lines 14a.

Next, a laminate (not shown) of MoN, Al, MoN and Mo films is formed to pattern the source electrode S, storage capacitor electrode 12 and bus lines 14b. Here, in FIG. 7, the data bus lines 14b of the laminate of MoN, Al, MoN and Mo films are so patterned as to be located on the inside of the data bus lines 14a of ITO or ZnO. Thus, data bus lines 14 of the laminate of ITO or ZnO and MoN, Al, MoN and Mo films are formed. Further, the storage capacitor electrode 12 or the source electrode S is so formed as to be partly overlapped on parts of the compensation electrodes 24a, 24b and 24c. In FIG. 7, the source electrode S is overlapped on the compensation electrode 24c.

Next, the laminate of operation semiconductor a-Si film and $n^+$ semiconductor $n^+$a-Si film is dry-etched to form a TFT 20. Next, a protection SiN film is formed on the whole surface of the substrate on the source electrode S, on the storage capacitor electrode 12 and on the data bus lines 14. Next, the protection SiN film is removed by etching from the portions thereof on part of the storage capacitor electrode 12, on part of the source electrode S and on the whole surfaces of the compensation electrodes 24a, 24b and 24c to thereby form contact holes 16, 22, 26a, 26b and 26c.

Next, a pixel electrode 18 is formed by using a transparent material ITO or ZnO. Here, the compensation electrodes 24a, 24b and 24c are arranged so as to be overlapped on the pixel electrode 18 being separated away therefrom by a predetermined distance. The pixel electrode 18 is electrically connected to the storage capacitor electrode 12, source electrode S and compensation electrodes 24a, 24b and 24c via the contact holes 16, 22, 26a, 26b and 26c, respectively. The compensation electrodes 24a, 24b and 24c are formed by the ITO or ZnO film, and possess an improved transmission factor, exhibiting the same effect as those of the above fifth to ninth embodiments.

What is claimed is:

1. A liquid crystal display device comprising:
    a plurality of first bus lines formed in parallel with each other on a substrate;
    a plurality of second bus lines formed in parallel with each other intersecting the plurality of the first bus lines via an insulating film;
    pixel regions formed on the regions defined by the first and the second bus lines;
    pixel electrodes formed on the pixel regions by being exposed to light through an exposing mask different from the second bus lines; and
    compensation electrodes formed simultaneously with the second bus lines by being exposed to light and arranged on the gaps across which the second bus lines and the pixel electrodes are opposed to each other, the compensation electrodes assuming the same potential as the pixel electrodes.

2. A liquid crystal display device according to claim 1, wherein the compensation electrodes are overlapped on the pixel electrode so that an end of the compensation electrodes are arranged on the gaps across which the second bus lines and the pixel electrodes are opposed to each other, and assume the same potential as the pixel electrode.

3. A liquid crystal display device according to claim 1, wherein the compensation electrodes are formed by using the same material as the second bus lines.

4. A liquid crystal display device according to claim 1, wherein the compensation electrodes are formed by using part of the materials that constitute the second bus lines.

5. A liquid crystal display device according to claim 1, wherein the compensation electrodes are formed by using a transparent material that constitutes the second bus lines.

6. A liquid crystal display device according to claim 1, wherein the compensation electrodes are formed by using a laminate of a-Si, $n^+$a-Si and Ti films.

7. A liquid crystal display device according to claim 1, wherein the compensation electrodes are formed by using a Ti film.

8. A liquid crystal display device according to claim 1, wherein the compensation electrodes are formed by using a laminate of a-Si and $n^+$a-Si films.

9. A liquid crystal display device according to claim 1, wherein the compensation electrodes are formed by using a-Si, $n^+$a-Si and ITO films.

10. A liquid crystal display device according to claim 1, wherein the compensation electrodes are formed by using an ITO film.

11. A liquid crystal display device according to claim 1, wherein the compensation electrodes are formed by using a-Si, $n^+$a-Si and ZnO films.

12. A liquid crystal display device according to claim 1, wherein the compensation electrodes are formed by using a ZnO film.

13. A liquid crystal display device according to claim 1, wherein the two second bus lines neighboring each other are applied with signal voltages of reverse polarities to each other.

* * * * *